United States Patent [19]
Quillin

[11] Patent Number: 5,966,893
[45] Date of Patent: Oct. 19, 1999

[54] CLIP FOR RETAINING ADJACENT PANELS IN A PLANAR RELATIONSHIP

[76] Inventor: David G. Quillin, 6655 Evanston, Muskegon, Mich. 49442

[21] Appl. No.: 09/121,318

[22] Filed: Jul. 22, 1998

Related U.S. Application Data

[60] Provisional application No. 60/053,505, Jul. 23, 1997.
[51] Int. Cl.⁶ .................................................. E04B 1/38
[52] U.S. Cl. ......................... 52/713; 52/712; 52/715; 52/282.2; 52/285.3; 52/489.1; 52/584.1
[58] Field of Search .......................... 52/712, 713, 714, 52/715, 281, 282.1, 282.2, 238.1, 285.3, 489.1, 582.1, 582.2, 584.1

[56] References Cited

U.S. PATENT DOCUMENTS

| | | |
|---|---|---|
| 1,246,585 | 11/1917 | Geraerdts . |
| 1,905,616 | 4/1933 | Zanella . |
| 2,258,574 | 10/1941 | Leary . |
| 2,807,063 | 9/1957 | Berow . |
| 3,113,358 | 12/1963 | Zell et al. ............................ 52/285.3 |
| 3,490,797 | 1/1970 | Platte ................................... 52/282.1 |
| 3,618,993 | 11/1971 | Platte ................................... 52/285 X |
| 3,842,554 | 10/1974 | Swick ...................................... 52/235 |
| 4,128,979 | 12/1978 | Price ....................................... 52/241 |
| 4,703,603 | 11/1987 | Hills . |
| 5,152,117 | 10/1992 | Wynar . |
| 5,517,731 | 5/1996 | Spykerman . |

Primary Examiner—Christopher T. Kent
Assistant Examiner—Yvonne Horton-Richardson
Attorney, Agent, or Firm—Rader, Fishman, Grauer & McGarry

[57] ABSTRACT

The invention is an apparatus and method for assembling a planar surface for multiple sheets of building material connected by multiple retaining clips. Each of the retaining clips comprises a first portion and a second portion. The first portion has a first receptacle defined by a central wall and an upper and lower flange. The second receptacle is defined by an opposite side of the central wall and a second lower flange. A first sheet is inserted into the first receptacle through the open side between the upper and lower flanges and opposite the central wall. A second sheet is pivoted through the open sides of the second receptacle, which are opposite the central wall and the second lower flange. The second portion comprises a T-shaped element having opposing tabs extending from a retaining tongue. The opposing tabs are received within a slot on the first portion such that the retaining tongue overlies the upper surface of a second sheet and closes one of the open sides of the second receptacle.

20 Claims, 4 Drawing Sheets

5,966,893

CLIP FOR RETAINING ADJACENT PANELS IN A PLANAR RELATIONSHIP

CROSS-REFERENCE TO RELATED APPLICATION

This application claims the benefit of U.S. Provisional Application No. 60/053,505 filed on Jul. 23, 1997.

BACKGROUND OF THE INVENTION

1. Field of the Invention

This invention relates to a clip for retaining adjacent plywood panels in a coplanar relationship and, more particularly, to a clip which enables a user to more easily mount adjacent panels together when surrounding structures limit available space.

2. Description of the Related Art

A roof is generally mounted to a dwelling structure by attaching panels, made from plywood, particle board, and the like, to a truss structure on an upper portion of the dwelling structure. The panels are preferably mounted to the truss in a planar relationship so that a set of shingles can be attached to an exterior surface of the panels, perhaps with an insulating member therebetween.

Because many of the panels tend to easily warp and bend, especially wood-based panels, it is known to provide one or more clips along the edges of adjacent panels which engage an edge of an adjacent panel and maintain the adjacent panels in a planar relationship. FIG. 1 shows an example of a prior art clip which illustrates this concept.

FIG. 1 shows a one-piece clip 10 which comprises a central transverse wall 12, an upper plane 14 of mounting tongues and a lower plane 16 of mounting tongues which extend orthogonally from upper and lower edges of the wall 12, respectively. The upper plane 14 of mounting tongues has a first tongue 18 with an aperture 19 and a second tongue 20 which typically is stamped from the aperture 19 and deformed 180 degrees with respect to the first tongue 18. The lower plane 16 of mounting tongues has a third tongue 22 with an aperture 23 and a fourth tongue 24 which is typically stamped from the aperture 23 and deformed 180 degrees with respect to the third tongue 22.

The clips 10 are typically used to interconnect sheets of plywood which are laid on a truss to make a smooth planar substrate adapted to receive insulation and shingles. An edge of a first plywood panel (not shown) is typically slid between the first and third tongues 18 and 22 after the plywood panel has been mounted to a truss. A second plywood panel (not shown) is then slid between the second and fourth tongues 20 and 24 mounted to the truss.

A disadvantage of the prior art clip is that it is difficult to maneuver large panels between the tongues 20 and 24 once the clip is mounted to a first panel mounted to the truss because the edge of the panel must be slid between the tongues 20, 24 as the tongues are lying co-planar with the roof. In addition, the prior art clips are not designed to accommodate specially-cut plywood sheets, especially sheets cut for specific corners and intersections of a tight or oblique nature.

SUMMARY OF THE INVENTION

In a first embodiment, the invention comprises a retaining clip for connecting adjacent sheets of building material to form a planar surface of abutting planar sheets. Each of the sheets has an upper and lower surface, which are connected by a peripheral edge. The retaining clip according to the invention comprises a first portion having a first receptacle with open ends and at least one open side adapted to receive a portion of a peripheral edge of the first sheet. The first portion further comprises a second receptacle with open ends and at least two adjacent open sides adapted to receive a peripheral edge and one of the upper and lower surface of a second sheet. The second receptacle is in opposing relationship to the first receptacle. The retaining clip further includes a second portion movable relative to the first portion to a closed position wherein one of the adjacent open sides of the second receptacle is closed. Whereby, the first receptacle is adapted to overlie the upper and lower surface of the first sheet when the first sheet is received within the first receptacle. The second receptacle is adapted to overlie one of the upper and lower surface of the second sheet when the second sheet is received within the second receptacle. And, the second portion, overlies the other of the upper and lower surfaces of the second sheet when the second portion is in the closed position to thereby connect the first and second sheets.

Preferably, the first portion and second portion of the retaining clips are physically separate. The first portion can comprise a vertically oriented central wall, a first lower flange extending from a lower edge of the central wall in a first substantially orthogonal direction relative to the vertical plane of the central wall, an upper flange extending from an upper edge of the central wall in the first substantially orthogonal direction, and a second lower flange extending from the lower edge in a second substantially orthogonal direction, which is generally opposite the first orthogonal direction. The first lower flange, upper flange, and central wall combine to define the first receptacle with one open surface being disposed between the upper flange and first lower flange, and opposite the central wall. Preferably, the second portion is T-shaped comprising opposing tabs extending from a retaining tongue. The opposing tabs are received within a slot on the first portion to lock the first portion to the second portion wherein the retaining tongue closes one of the open sides of the second receptacle.

The invention further comprises a method for assembling a generally planar surface for multiple sheets of building material with retaining clips. Each of the sheets has an upper surface and a lower surface connected by a peripheral edge. Each of the clips comprises a first portion having a first receptacle with open ends on at least one side for receiving a peripheral edge of a first sheet and a second receptacle with open ends and at least two adjacent open sides for receiving a peripheral edge on one of the upper and lower surfaces of a second sheet, adjacent the first sheet. Each of the clips further comprises a second portion movable relative to the first portion to a closed position to close one of the adjacent open sides of the second receptacle. The method of assembling a generally planar surface comprises inserting a portion of the peripheral edge of the first sheet into the first receptacle through the at least one open side; placing a portion of the peripheral edge and one of the upper and lower surfaces of the second sheet through the at least two open sides of the second receptacle; and closing one of the at least two open sides of the second receptacle.

Preferably, the method includes inserting a portion of the peripheral edge of the first sheet into an open side of the first receptacle which is opposite a central wall and between an upper flange and a first lower flange of the first portion of the clip. The method preferably further comprises pivoting a portion of the peripheral edge in the lower surface of a second sheet through two adjacent open sides of the second receptacle formed by the central wall and a second lower flange extending opposite the first lower flange. Additionally, the method preferably includes closing one of the two open sides by inserting the opposing tabs of the T-shaped second portion into a slot on the first portion such that a retaining tongue on the T-shaped second portion overlies the upper surface of a second sheet to close one of the open side of the second receptacle.

Other objects, features, and advantages of the invention will be apparent from the ensuing description in conjunction with the accompanying drawings.

DETAILED DESCRIPTION OF THE PREFERRED EMBODIMENTS

Figure 1:
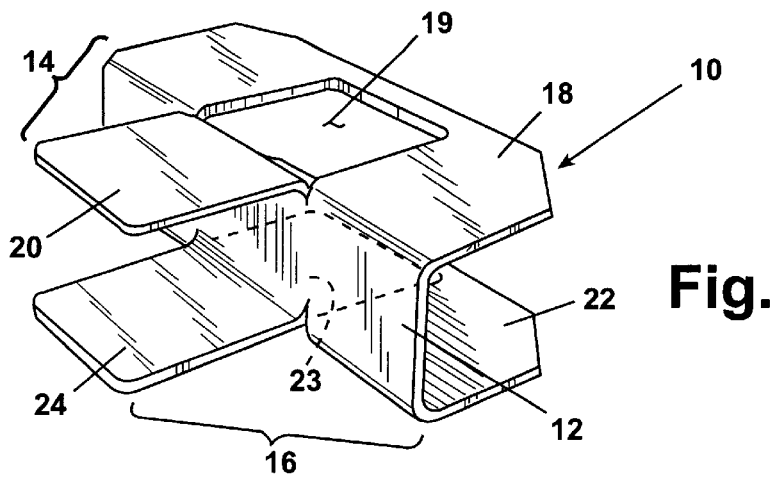
FIG. 1 is a perspective view of a prior art clip.
Figure 2:
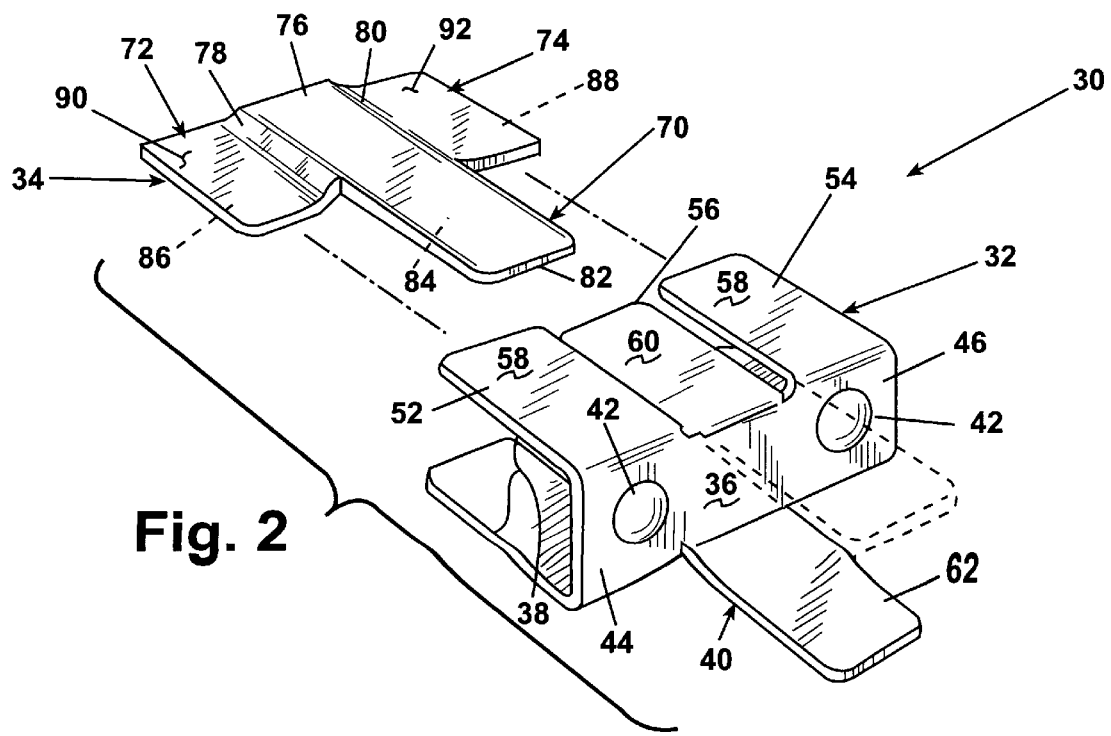
FIG. 2 is a exploded perspective view of a clip having first and second portions according to the invention.
Figure 3:
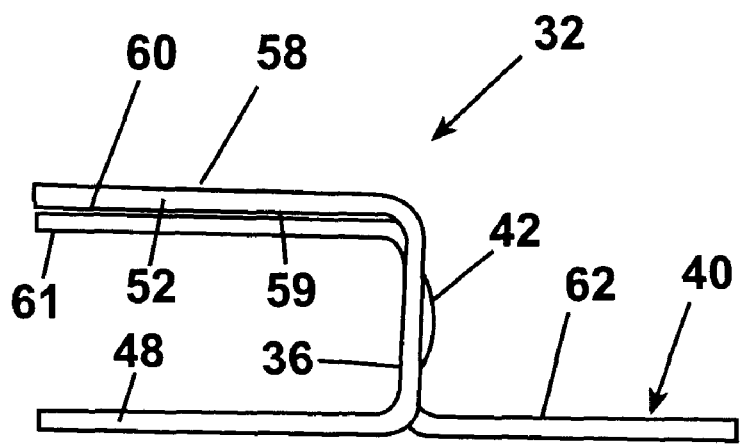
FIG. 3 is a side elevational view of the first portion of the clip of FIG. 2 with the second portion removed for clarity.
Figure 4:
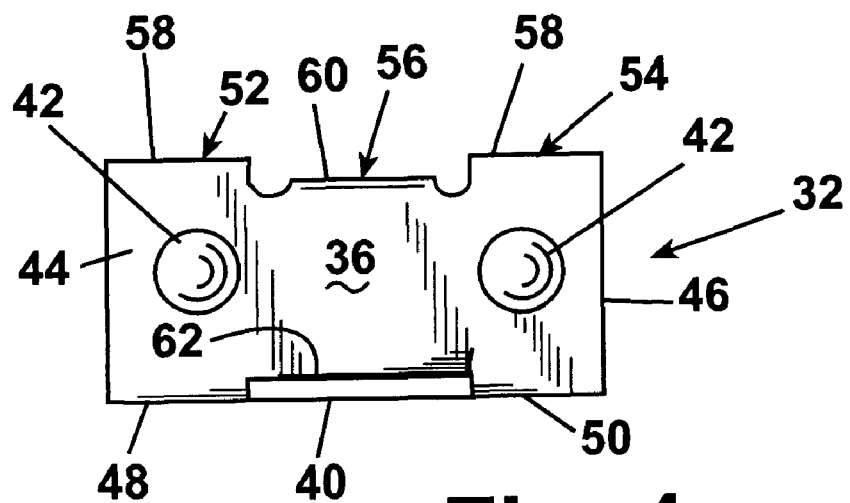
FIG. 4 is a rear elevational view of the first portion of the clip of FIG. 2 with the second portion removed for clarity.
Figure 5:
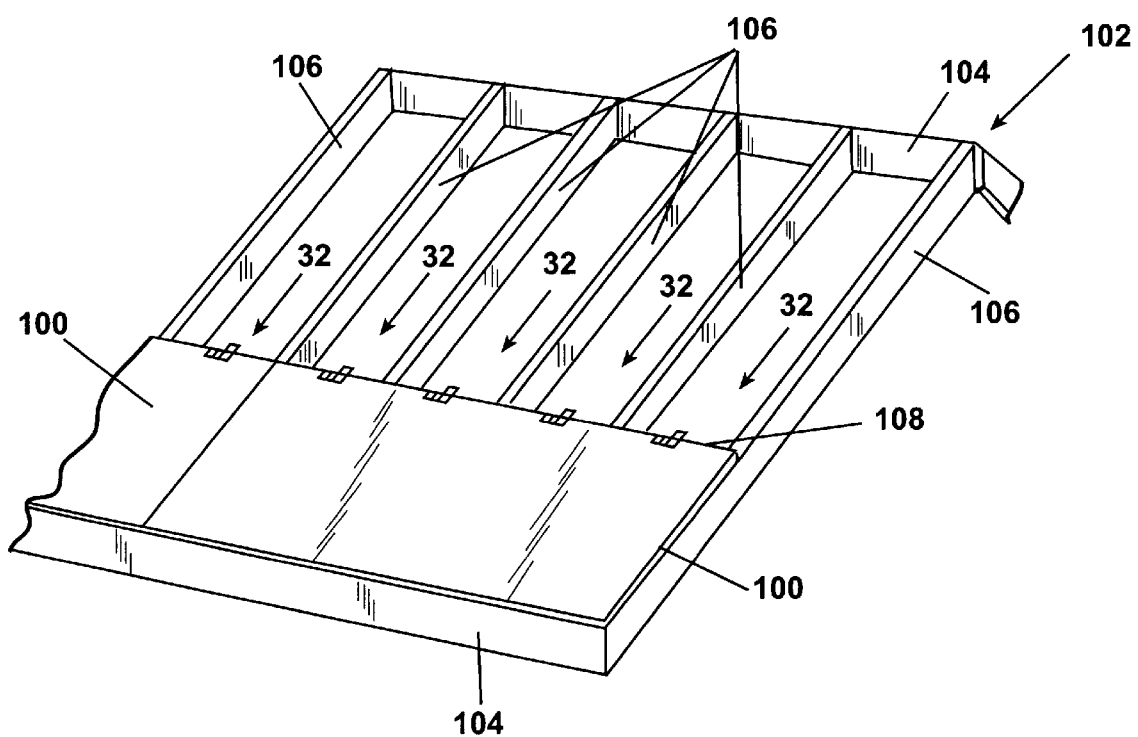
FIG. 5 is a perspective view showing the clip of FIG. 2 in relation to rafters and a plywood substrate of a roof.
Figure 6:
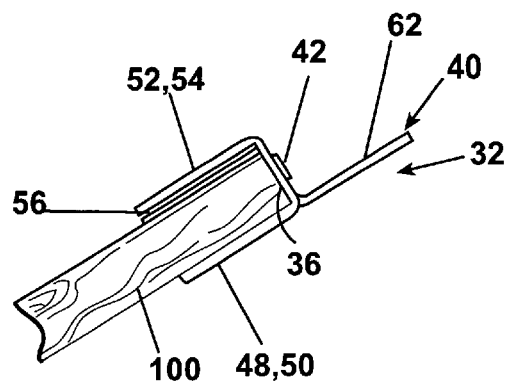
FIG. 6 is a cross-sectional view of a length of plywood panel receiving the clip of FIG. 2 with the second portion removed.
Figure 7:
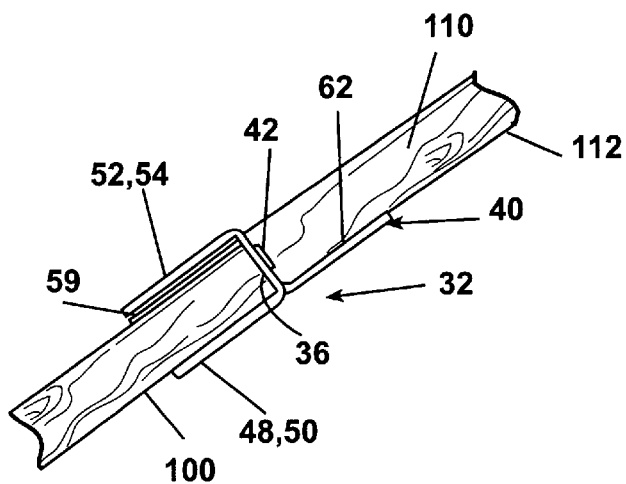
FIG. 7 is a cross-sectional view of two adjacent plywood panels showing the clip of FIG. 2 with the second portion removed.
Figure 8:
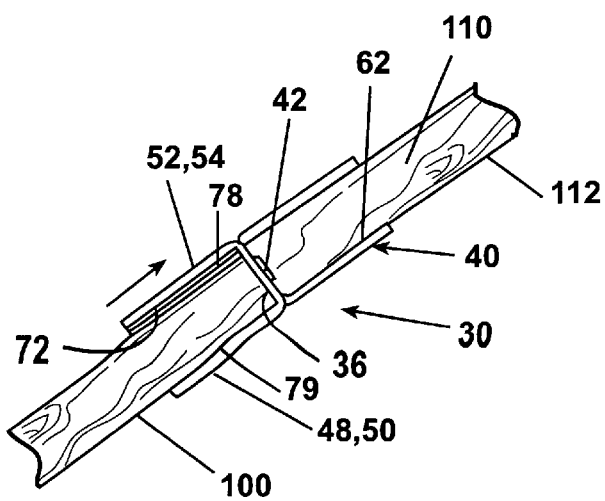
FIG. 8 is a cross-sectional view of two adjacent plywood panels showing the clip of FIG. 2 with the second portion inserted whereby edges of the adjacent plywood panels are retained therein.

Referring now to the drawings and to FIGS. 2–8 in particular, a clip 30 is shown formed preferably of a metal or a metal alloy; however, any rigid material can be used without departing from the scope of this invention. The clip 30 comprises a first portion 32 and a second portion 34.

The first portion 32 has a central wall 36, a double-sided open-faced or C-shaped receptacle 38 extending from one side of the wall 36 and a single-sided open-faced receptacle comprising a lower mounting tongue 40 extending from an opposite side of the wall 36 adjacent a lower edge thereof. The single-sided and double-sided receptacles are in opposing relationship and each receptacle has open ends. The central wall 36 of the first portion 32 has a first end 44 and a second end 46. Rounded protrusions 42 are located in an inwardly-spaced relationship with respect to the ends 44 and 46.

The C-shaped receptacle 38 comprises a first lower tongue 48, a second lower tongue 50, a first upper tongue 52, a second upper tongue 54, and a central tongue 56. The first lower tongue 48 and first upper tongue 52 are located adjacent the first end 44 of the central wall 36 and extend orthogonally therefrom. The second lower tongue 50 and second upper tongue 54 are located adjacent the second end 46 of the central wall 36 and extend orthogonally therefrom, generally parallel to the first upper and lower tongues 48 and 52, and also in the same direction thereof. Both the first and second upper tongues 52 and 54 have an upper surface 58 and a lower surface 59. The central tongue 56 has an upper surface 60 and a lower surface 61. The plane of the upper surface 60 is offset in planar alignment from the upper surfaces 58 of the first and second upper tongues 52 and 54. Preferably, the upper surface 60 of the central tongue is generally aligned with the lower surfaces 59 of the tongues 52, 54.

Further, the tongue 56 is located between the first upper tongue 52 and second upper tongue 54, and extends orthogonally therefrom in the same direction as that of the tongues 48–54. It will be understood that the offset in elevation of the upper surface 60 of the central tongue 56 with respect to the first and second upper tongues 52 and 54 is preferably equivalent in thickness to that of the upper tongues 52, 54 therein.

The lower mounting tongue 40 has an upper surface 62 and is located in lateral alignment between the first and second lower tongues 48 and 50. The lower mounting tongue 40 extends orthogonally from a side of the central wall 36 opposite to that of the lower tongues 48, 50 and preferably coplanar therewith.

To assemble the first portion 32 and the second portion 34 of the clip 30, the top surface 60 of the central tongue 56 is aligned with the bottom surface 84 of the tongue 70. The bottom surface 84 of the tongue 70 is slid over the top surface 60 of the central tongue 56 and laterally between the first and second upper tongues 52 and 54 so that bottom surface 84 and the top surface 60 abut one another. The first tab 72 and the second tab 74 slide beneath the first upper tongue 52 and the second upper tongue 54 of the first portion 32. The upper surfaces 90 and 92 of the tabs 72 and 74 abut the bottom surface 59 of the first and second upper tongues 52 and 54.

The mounting between the first portion 32 and the second portion 34 is complete when the upper mounting tongue has extended fully passed the central wall 36 and when a forward edge of the tabs 72 and 74 abut the central wall 36 therein. The bottom surfaces 86 and 88 of the tabs 72 and 74 are then generally coplanar with the bottom surface 61 of the central tongue 56. It should be noted that ramped portions 78 and 80 extend between a rear portion 76 of the tongue 70 and the tabs 72 and 74, respectively.

FIGS. 5–8 show the use of the clip 30 in a typical roofing application whereby plywood panels 100 are mounted to a truss 102 which comprises lateral members 104 and rafters 106.

The first portion 32 of the clip 30 is placed along an edge 108 of a first panel 100 which is mounted on rafters 106. More specifically, the receptacle 38 of the first portion 32 is fitted over the edge 108 of the first panel 100 thereof so that the upper tongues 52 and 54 and the lower tongues 48, 50 engage upper and lower surfaces of the panel 100. It will be understood that one or more clips 30 can be mounted along edge 108 of the panels 100 in similar fashion.

A second panel 110 with an adjacent edge 112, as shown in FIGS. 5–8, is then positioned so that the edge 110 lies atop the surface 62 of the bottom mounting tongue 40 and abuts the dimples 42 of the central wall 36. The dimples 42 offer spacing between the first panel 100 and the second panel 110. It will be understood that the first and second panels 100 and 110 can be of any shape or thickness, with the clip being correspondingly sized as required for fitting within the structure of the particular truss 102.

As described above, the second portion 34 is then mounted to the first portion 32 whereby the bottom surfaces 86 and 88 of the tabs 72 and 74 and the bottom surface 61 of the central tongue 56 are generally flush and bear against an adjacent surface of the first panel 100. Further, the tongue 70 extends over an adjacent surface of the second panel 112, locking the panel 112 between the bottom surface 84 of the tongue 70 and the top surface 62 of the lower mounting tongue 40, whereby adjacent edges of the panels 100 are maintained in a generally coplanar relationship. In this position, the second portion closes one of the open sides of the second receptacle of the first portion.

While particular embodiments of the invention have been shown, it will be understood, of course, that the invention is not limited thereto since modifications may be made by those skilled in the art, particularly in light of the foregoing teachings. For example, the second portion 34 could comprise a deformable flange extending generally orthogonally from the central wall relative to the mounting tongue 40, whereby after the clip is mounted to a first sheet as described and a second sheet is placed on the tongue 40, the deformable flange can be bent over the second sheet, such as by striking the deformable flange with a hammer. Reasonable variation and modification are possible within the scope of the foregoing disclosure of the invention without departing from the spirit of the invention.

The embodiments for which an exclusive property or privilege is claimed are defined as follows:

1. A retaining clip for connecting adjacent sheets of building material to form a planar surface of abutting planar sheets, each sheet having upper and lower planar surfaces connected by a peripheral edge, the retaining clip comprising:

a first portion comprising:

a first receptacle opening in a first direction adapted to receive a peripheral edge of a first sheet from the first direction; and a second receptacle opening opposite to the first direction and in a second direction not parallel to the first direction adapted to receive a peripheral edge of a second sheet from the second direction, the second receptacle being in opposing relationship to the first receptacle; and a second portion moveable relative to the first portion between an open position wherein the second portion does not obstruct the second sheet from being inserted into the second receptacle from the second direction and a closed position wherein the second portion prevents movement of the second sheet in the second direction;

whereby the first sheet and the second sheet are maintained in a planar relationship when the second portion is located in the closed position.

2. A retaining clip according to claim 1 wherein the first portion and the second portion are physically separated.

3. A retaining clip according to claim 2 wherein the second portion is T-shaped having a retaining tongue from which extends opposing tabs, the first portion has a slot for receiving the opposing tabs when the second portion is in the closed position, and the retaining tongue prevents movement of the second sheet in the second direction when the second portion is in the closed position.

4. A retaining clip according to claim 3 wherein the first portion comprises:

a vertically oriented central wall with an upper edge and a lower edge;

a first lower flange extending from the lower edge in the first direction relative to a vertical plane of the central wall;

an upper flange extending from the upper edge in the first direction;

a second lower flange extending from the lower edge in the second direction; and wherein the first lower flange, upper flange, and central wall define the first receptacle having one open side opposite the central wall and between the upper flange and first lower flange and the central wall and second lower flange define the second receptacle having two open sides opposite the central wall and the second lower flange.

5. A retaining clip according to claim 4 wherein the upper flange comprises opposing outer tongues separated by a central tongue, each tongue has an upper and lower surface, and a gap is formed between the upper surface of the center tongue and the lower surface of each outer tongue to define the slot in which the tabs of the second portion are received.

6. A retaining clip according to claim 5 wherein the upper surface of the central tongue is below the lower surface of the outer tabs.

7. A retaining clip according to claim 5 wherein the second portion retaining tongue has an upper surface and a lower surface, the tabs have an upper surface and a lower surface, the upper surfaces of the tabs are disposed below the upper surface of the retaining tongue and the upper surfaces of the tabs abut the lower surfaces of the outer tongues and the retaining tongue extends between the outer tongues and extends beyond the central wall in the second direction to thereby prevent movement of the second sheet in the second direction when the second portion is in the closed position.

8. A retaining clip according to claim 7 wherein at least a portion of the retaining tongue overlies the second lower flange when the first portion is in the closed position.

9. A retaining clip according to claim 4 wherein the central wall has at least one protrusion adapted to space one of the first or second sheets from the central wall.

10. A retaining clip according to claim 5 wherein the first and second portions are made from stamped metal.

11. A retaining clip for connecting adjacent sheets of building material to form a planar surface of abutting planar sheets, each sheet having upper and lower planar surfaces connected by a peripheral edge, the retaining clip comprising:

means for defining a first receptacle adapted to receive a first sheet by slidably inserting a portion of a peripheral edge of a first sheet into the first receptacle in a first direction;

means for defining a second receptacle adapted to receive a second sheet by pivoting a portion of a peripheral edge and the lower surface of the second sheet into the second receptacle in a second direction; and means for closing a portion of the second receptacle and adapted to prevent the pivotal removal of the second sheet from the second receptacle in the second direction.

12. A retaining clip according to claim 11 wherein the closing means comprises a T-shaped retainer having retaining tongue with opposing tabs extending from the retaining tongue and means for connecting the retainer to the first receptacle.

13. A retaining clip according to claim 12 wherein the means for defining the first receptacle comprises a vertically oriented central wall with an upper edge and a lower edge, a first lower flange extending from the lower edge in the first direction relative to a vertical plane of the central wall, an upper flange extending from the upper edge in the first direction, and the first lower flange, upper flange and central wall define the first receptacle with one open side opposite the central wall and between the first lower flange and the upper flange adapted to slidably receive a peripheral edge of a first sheet.

14. A retaining clip according to claim 13 wherein the connecting means comprises the upper flange having spaced outer tongues separated by a central tongue, each tongue having an upper and lower surface, and a gap formed between the upper surface of the center tongue and the lower surfaces of each outer tongue to define the slot in which the tabs of the T-shaped retainer are received.

15. A retainer clip according to claim 14 wherein the means defining the second receptacle comprises the central wall and a second lower flange extending from the central wall lower edge in the second direction generally opposite the first direction, wherein the central wall and the second lower flange define the second receptacle with two open sides opposite the central wall and second lower flange, and the retaining tongue overlies the second lower flange when the closing means closes the second receptacle.

16. A method for assembling a generally planar surface from multiple sheets of building material with retaining clips, each sheet having an upper and lower surface connected by a peripheral edge, and each clip comprising a first portion having a first receptacle opening in a first direction for receiving a peripheral edge of a first sheet, and a second receptacle opening opposite to the first direction and in a second direction for receiving a peripheral edge of a second sheet, the second receptacle being in opposing relationship to the first receptacle; and a second portion moveable relative to the first portion to a closed position to close one of the adjacent open sides of the second receptacle, the method comprising:

inserting a portion of the peripheral edge of the first sheet into the first receptacle along the first direction;

placing a portion of the peripheral edge of the second sheet into of the second receptacle along the second direction; and closing at least a portion of the second receptacle to prevent movement of the second sheet in the second direction and to maintain the first and second sheets in a planar relationship.

17. A method according to claim 16 wherein the placing of a portion of the second sheet into the second receptacle includes pivoting a portion of the peripheral edge and one of the upper and lower surfaces of the second sheet into the second receptacle.

18. A method according to claim 16 wherein the first portion comprises a vertically oriented central wall with an upper edge and a lower edge, a first lower flange extending from the lower edge in the first direction relative to a vertical plane of the central wall, an upper flange extending from the upper edge in the first direction, wherein the first lower flange, upper flange, and central wall define a first receptacle with an open side between the upper and first lower flange and opposite the central wall and the inserting of the first sheet includes inserting a portion of the first sheet peripheral edge into the open side of the first receptacle along the first direction.

19. A method according to claim 18 wherein the first portion further comprises a second lower flange extending from the lower edge in the second direction generally opposite the first direction, the central wall and second lower flange define the second receptacle with two open sides opposite the central wall and the second lower flange, and the placing of the second sheet in the second receptacle includes pivoting the peripheral edge and the lower surface of the second sheet through the open sides of the second receptacle with a portion of the peripheral edge abutting the central wall and a portion of the second sheet lower surface abutting the second lower flange.

20. A method according to claim 16 wherein the second portion is T-shaped having opposing tabs extending from a retaining tongue and the first portion has a slot for receiving the opposing tabs and the closing of the one of the two open sides of the second receptacle includes inserting the tabs of the second portion into the slot of the first portion whereby the retaining tongue overlies the upper surface of the second sheet to close one of the open sides of the second receptacle.

* * * * *

UNITED STATES PATENT AND TRADEMARK OFFICE
CERTIFICATE OF CORRECTION

PATENT NO.: 5,966,893

DATED: October 19, 1999

INVENTOR(S): DAVID G. QUILLIN

It is certified that error appears in the above-identified patent and that said Letters Patent is hereby corrected as shown below:

Claim 12, col. 6, line 55, after "having" insert --a--.

Claim 16, col. 7, line 33, after "into" delete "of".

Signed and Sealed this

Sixth Day of June, 2000

Attest:

Attesting Officer

Q. TODD DICKINSON

Director of Patents and Trademarks